(12) United States Patent
Sumiuchi

(10) Patent No.: US 11,204,731 B2
(45) Date of Patent: Dec. 21, 2021

(54) INFORMATION PROCESSING METHOD, INFORMATION PROCESSING APPARATUS, AND INFORMATION PROCESSING SYSTEM FOR TRANSMITTED INFORMATION FROM A SERVER

(71) Applicant: CANON KABUSHIKI KAISHA, Tokyo (JP)

(72) Inventor: Kazuyoshi Sumiuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/825,882

(22) Filed: Mar. 20, 2020

(65) Prior Publication Data

US 2020/0310730 A1  Oct. 1, 2020

(30) Foreign Application Priority Data

Mar. 29, 2019 (JP) .............................. JP2019-068046

(51) Int. Cl.
  *G06F 3/12*  (2006.01)
  *G06F 16/954*  (2019.01)
  *G06F 8/61*  (2018.01)
  *G06F 3/0484*  (2013.01)

(52) U.S. Cl.
  CPC ........ *G06F 3/1292* (2013.01); *G06F 3/04842* (2013.01); *G06F 3/1285* (2013.01); *G06F 8/61* (2013.01); *G06F 16/954* (2019.01)

(58) Field of Classification Search
  CPC .................................................. G06F 3/1292
  USPC ....................................................... 358/1.15
  See application file for complete search history.

(56) References Cited

U.S. PATENT DOCUMENTS

2016/0274741 A1*  9/2016  Kawai ................... G06F 9/4806
2017/0351467 A1*  12/2017  Wakabayashi ........ G06F 3/1205
2018/0219845 A1*  8/2018  Sumiuchi .............. G06F 3/1292

FOREIGN PATENT DOCUMENTS

JP  5736756 B2  6/2015

* cited by examiner

*Primary Examiner* — Jacky X Zheng
(74) *Attorney, Agent, or Firm* — Canon U.S.A., Inc. I.P. Division

(57) ABSTRACT

An information processing method is implemented by executing a processing application program by an information processing apparatus configured to perform display. When the transmitted information including app information regarding another application program is received from a server, a received predetermined object is displayed on a display device. The transmitted information includes types of app information pieces corresponding to operating systems. The app information is extracted from among the types of app information pieces. The extracted app information corresponds to an operating system on which the processing application program is operated. A process based on the transmitted information is executed when a user indicates the displayed predetermined object. As the process, a process for causing the other application program to be installed on the information processing apparatus is executed based on the extracted app information when the other application program is not installed on the information processing apparatus.

19 Claims, 8 Drawing Sheets

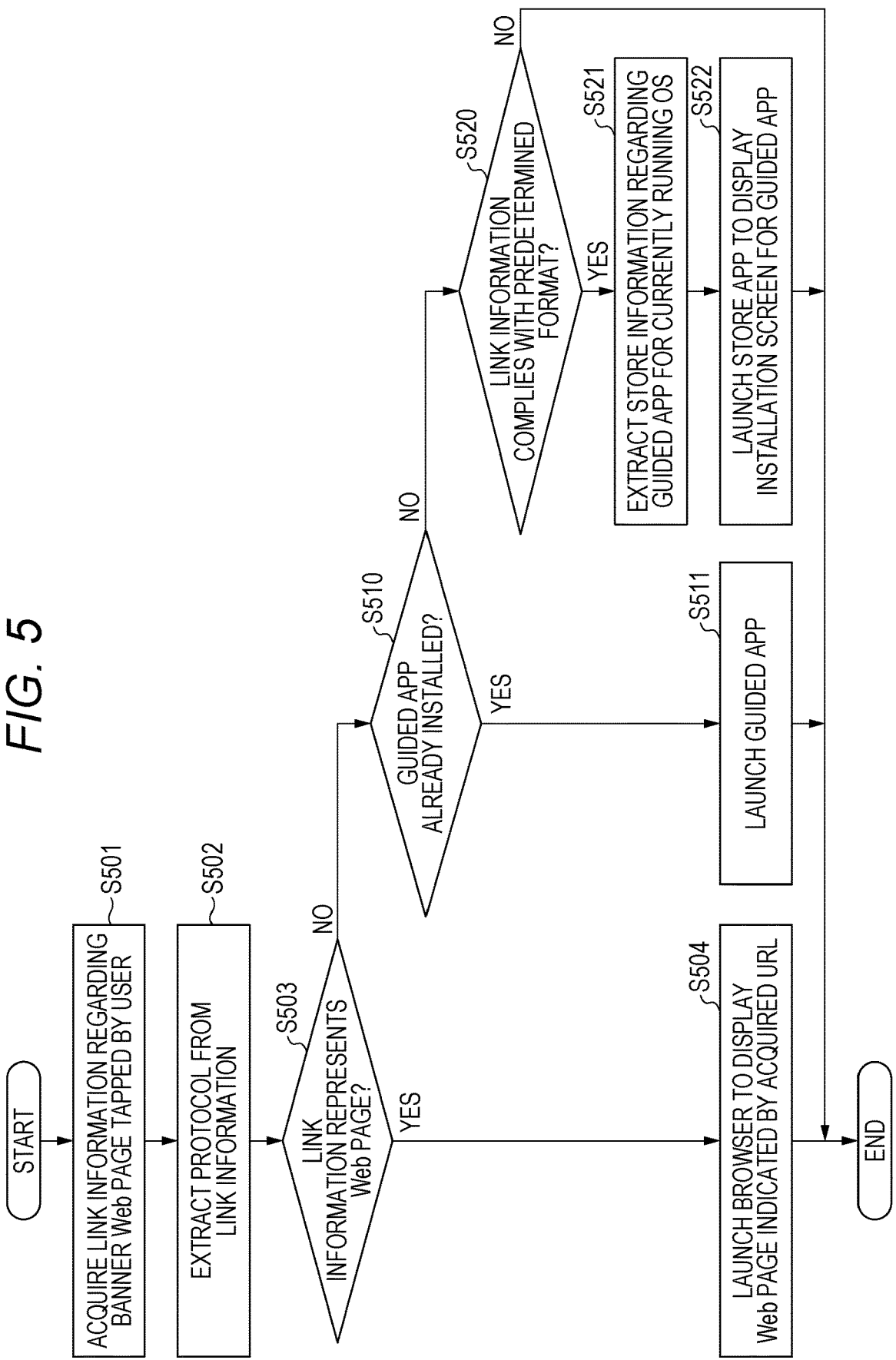

FIG. 6A

```
           ┌──────────────── URI ────────────────┐
<a href="https://www.aaa.com/photobook.html">
          └─┬──┘
         PROTOCOL
```

FIG. 6B

```
           ┌──────────────────── URI ────────────────────┐
<a href="appx://?os_a=id123456789&os_b=com.aaa.bbb.appx">
          └──┬─┘ └────────┬───────┘ └─────────┬────────┘
         PROTOCOL     OS_A STORE          OS_B STORE
                     INFORMATION         INFORMATION
```

FIG. 6C

```
           ┌─────────────────────── URI ───────────────────────┐
<a href="appx://?os_a_jp=id12345678&os_a_other=id12341234">
          └──┬─┘ └─────────┬────────┘ └──────────┬──────────┘
         PROTOCOL      OS_A STORE            OS_A STORE
                      INFORMATION           INFORMATION
                       FOR JAPAN             FOR OTHERS
```

INFORMATION PROCESSING METHOD, INFORMATION PROCESSING APPARATUS, AND INFORMATION PROCESSING SYSTEM FOR TRANSMITTED INFORMATION FROM A SERVER

BACKGROUND

Field

The present disclosure relates to an application program that displays information based on transmitted information transmitted from a server.

Description of the Related Art

Conventionally, users of information processing apparatuses such as smartphones can receive and browse information transmitted by an individual or company via the Internet. Examples of the transmitted information include a web page for advertisement or publicity, called a banner, displayed in an application running on a smartphone. Japanese Patent No. 5736756 describes a technique by which a predetermined application is launched by an action performed by a user, such as tapping a display area displayed by an application, in response to such transmitted information.

According to the method described in the aforementioned literature, concerning an application to be launched, the user can associate transmitted information with launched app information in advance.

However, according to the method described in the aforementioned literature, in order that a user can associate transmitted information with app information regarding an application to be launched based on the transmitted information, the user needs to install the application on an information processing apparatus in advance.

SUMMARY

An aspect of the present disclosure works to provide a technique by which a user can easily install an app based on transmitted information transmitted from a server.

According to an aspect of the present disclosure, an information processing method is implemented by executing a processing application program by an information processing apparatus configured to perform display based on transmitted information transmitted from a server, and includes displaying, when the transmitted information including app information regarding another application program different from the processing application program is received from the server, a predetermined object included in the transmitted information on a display device, wherein the transmitted information includes a plurality of types of app information pieces corresponding to a plurality of operating systems, extracting the app information from among the plurality of types of app information pieces, wherein the extracted app information corresponds to an operating system on which the processing application program is operated, and executing a process based on the transmitted information when the predetermined object displayed on the display device is indicated by a user, wherein executing includes executing, as the process, a process for causing the other application program to be installed on the information processing apparatus based on the extracted app information when the other application program is not installed on the information processing apparatus.

Further features of the present disclosure will become apparent from the following description of exemplary embodiments with reference to the attached drawings.

BRIEF DESCRIPTION OF THE DRAWINGS

FIG. 5 is a flowchart applied when a banner display area is tapped according to an embodiment.

FIGS. 6A to 6C are example diagrams illustrating link information according to an embodiment.

DESCRIPTION OF THE EMBODIMENTS

Embodiments of the present disclosure will now be described by way of examples with reference to the drawings. It should be understood, however, that modifications and/or improvements made to the following embodiments as appropriate without departing from the gist of the present disclosure and on the basis of common knowledge of persons skilled in the art are within the scope of the present disclosure.

First Embodiment

Figure 1:
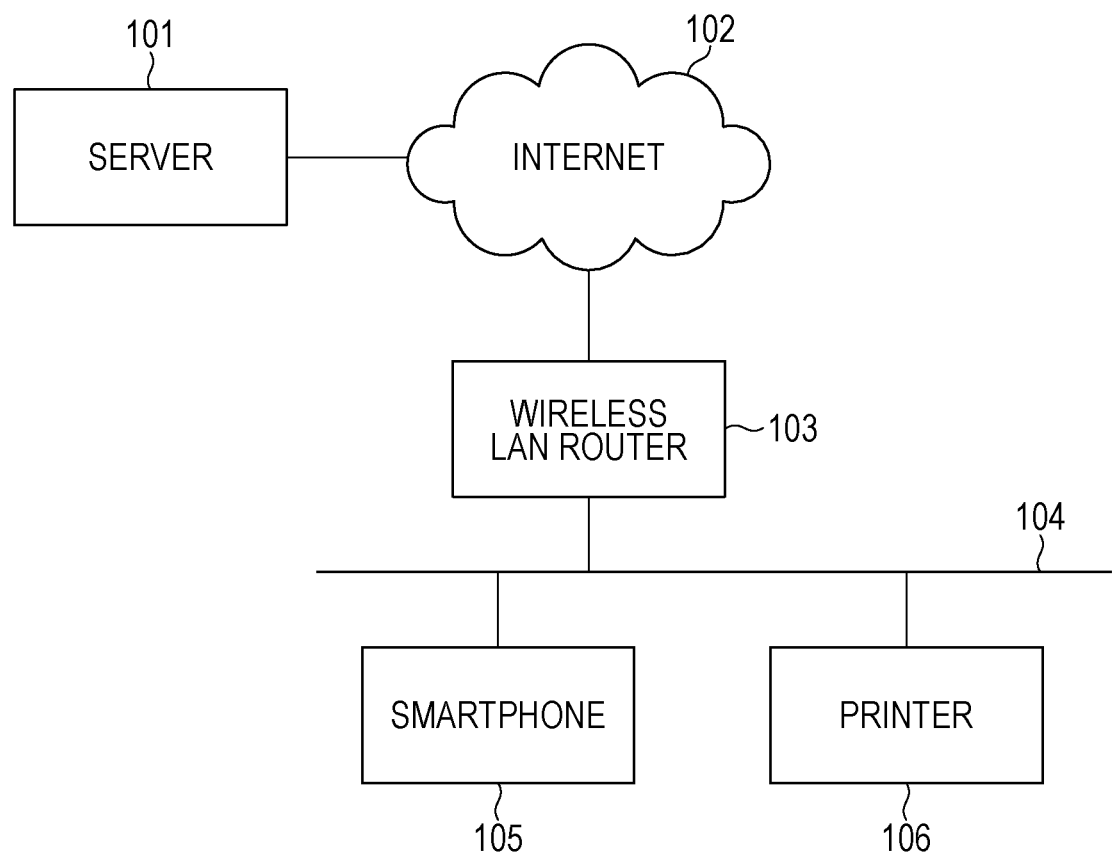
FIG. 1 is an example diagram illustrating a connection configuration of devices according to an embodiment.

Referring to FIG. 1, the following describes an information processing system according to the present embodiment. In the present embodiment, an information processing apparatus is exemplified by a smartphone, but the information processing apparatus is not limited thereto, and a variety of other apparatuses may be applicable including mobile terminals, notebook PCs, tablet terminals, personal digital assistants (PDAs), and digital cameras. In addition, a communication apparatus is exemplified by a printer in the present embodiment, but the communication apparatus is not limited thereto, and a variety of other apparatuses can be applied as long as the apparatus can communicate with the information processing apparatus. For example, regarding printers, ink jet printers, full-color laser beam printers, black-and-white printers, and the like may be applicable. Apparatuses other than printers may also be applicable including copy machines, facsimile machines, mobile terminals, smartphones, notebook PCs, tablet terminals, PDAs, and digital cameras. Furthermore, a multifunction device having copy functions, fax functions, and printer functions may also be applicable. Note that a server 101, Internet 102, and a wireless LAN router 103 in FIG. 1 will be described later.

Figure 2:
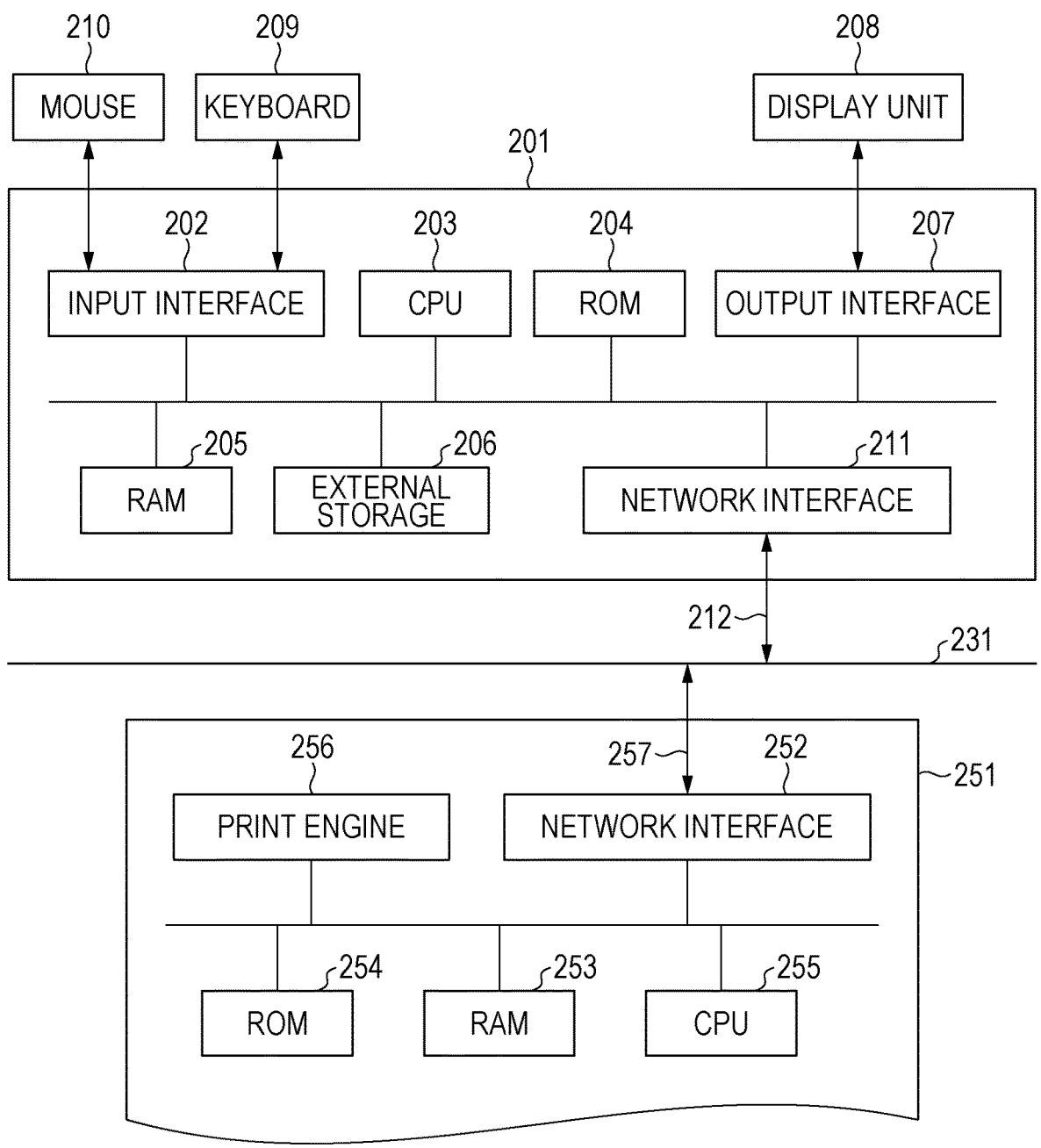
FIG. 2 is an example diagram illustrating a configuration of an information processing apparatus according to an embodiment.

Referring to the block diagram in FIG. 2, the following describes a configuration of the information processing apparatus of the present embodiment and a configuration of the communication apparatus capable of communicating with the information processing apparatus. The following configuration is an example in the description of the present embodiment, and the present embodiment can be applied to an apparatus capable of communicating with the communication apparatus and is not particularly limited to the functions illustrated in the figure.

The information processing apparatus 201 includes an input interface 202, a CPU 203, a ROM 204, a RAM 205, an external storage 206, an output interface 207, a display unit 208, and a network interface 211. The information processing apparatus 201 further includes a communication unit (not illustrated) to be connected to the Internet via a mobile communication network such as 3G or LTE.

The network interface 211 and the network interface 252 can be connected to a network 231 via a communication path 212 and a communication path 257, respectively. Note that the network interface 252 may operate as an access point (not illustrated) in the communication apparatus 251. In this case, the network interface 211 can be directly connected to the network interface 252 without going through an external access point. In this way, the network interface 211 and an access point in the communication apparatus 251 are connected, whereby the information processing apparatus 201 and the communication apparatus 251 are allowed to communicate with each other. Note that communications may be made directly by wireless communication or may be made through an access point placed outside the apparatuses on a wired network. Examples of a communication method include wireless fidelity (Wi-Fi) (registered trademark), Bluetooth (registered trademark), and near field communication (NFC; ISO/IEC IS 18092). An access point as used in the present disclosure refers to a device having functions of connecting the information processing apparatus 201 and the communication apparatus 251 to each other and to another network such as the Internet. Typical examples of the device having the function of an access point include the wireless LAN router in FIG. 1.

The ROM 204 contains an initialization program, the external storage 206 contains an operating system (not illustrated, hereinafter called an OS), and the OS includes a print service program responsible for print control. In addition, the external storage 206 stores an application that provides users with print execution and also stores a print information generator program that generates print information interpretable to the communication apparatus 251. The external storage 206 further stores various programs including an information send/receive control program for sending and receiving the generated print information to and from the communication apparatus 251 via the network interface 211, and also stores various types of information to be used by the OS and these programs. The CPU 203 executes processes based on various programs, whereby functions of the information processing apparatus 201 and the process shown in the after-mentioned flowchart are implemented. To simplify explanation, processes are hereinafter described as being executed not by the CPU 203 but by programs.

The communication apparatus 251 includes the network interface 252, a RAM 253, a ROM 254, a CPU 255, and a print engine 256. The network interface 252 has an access point, and the access point can be connected to the network interface 211 in the information processing apparatus 201.

The RAM 253, which is used as a main memory and a work memory for the CPU 255, stores a receiving buffer and various types of information, the receiving buffer being used for temporarily storing received print information. The print engine 256 executes printing based on the information stored in the RAM 253.

The ROM 254 contains various control programs and information pieces to be used by the individual control programs. In accordance with these control programs, the CPU 255 controls the individual components of the communication apparatus 251.

Processes are assigned to the information processing apparatus 201 and the communication apparatus 251 as described above, but the assignment is not particularly limited and processes may be assigned in other ways.

Note that processes shown in the flowcharts in the following embodiments are implemented by the CPU 203 included in a smartphone 105, which serves as the information processing apparatus 201. Specifically, the CPU 203 loads a control program relating to the flowchart as stored in the ROM 204 or an HDD (not illustrated) into the RAM 205 and executes the control program, whereby processes described below with reference to the following flowcharts are implemented.

Referring to FIG. 1, the following describes a connection configuration of the individual devices including the server 101, the Internet 102, and the wireless LAN router 103. The smartphone 105, which is an example of the information processing apparatus 201 in FIG. 2, is configured such that, for example, neither a mouse 210 nor a keyboard 209 is connected thereto but the display unit 208 serving as a display device is formed of a touch panel providing both display and user input functions. A printer 106 is an example of the communication apparatus 251.

The server 101 transmits transmitted information, via the Internet 102, to the smartphone 105 being used by a user. The smartphone 105 is connected to the wireless LAN router 103 via a network 104, and the wireless LAN router 103 is connected to the Internet 102, whereby the smartphone 105 is allowed to have Internet communications via the wireless LAN router 103. In addition, the communication apparatus such as the printer 106 is connected to the network 104, whereby the smartphone 105 and the printer 106 can communicate with each other via the wireless LAN router 103.

Regarding the connection configuration of the network 104, the connection is illustrated as being made to the Internet 102 via the wireless LAN router 103, but the connection may not necessarily be made wirelessly and may be made in a wired manner.

On the smartphone 105, not only an OS but also application programs operated on the OS and having various functions are installed.

In the present embodiment, the user launches a predetermined application present in the smartphone 105. The predetermined application refers to an application that displays an object (an image, text, or the like) in the form of a banner in a predetermined display area, the object being based on transmitted information transmitted from the server 101. Functions of the predetermined application are performed by executing an application program stored in the smartphone 105. Note that the transmitted information transmitted from the server 101 includes the link information described below as well as including the aforementioned object to be displayed as a banner.

As an example of the aforementioned predetermined application, the following describes an application having the function of causing a printer to print image data and document data stored in the smartphone 105. An application having such print functions is hereinafter called a print app. Note that the print app may have other functions in addition to the aforementioned functions. For example, if the printer 106 is a multifunction device having scanning functions, the print app may have the function of scanning an original document placed in the multifunction device and the function of making other settings for the printer 106. The print app may also have the function of acquiring image data and/or document data from a cloud server (not illustrated) via the Internet 102 to print such data.

The print app is stored in the ROM 204 or the external storage 206 and the CPU 203 executes application programs for the print app, whereby functions provided by the print app are performed. However, the following descriptions are provided on the assumption that processes are executed by the print app itself.

Figure 3A:
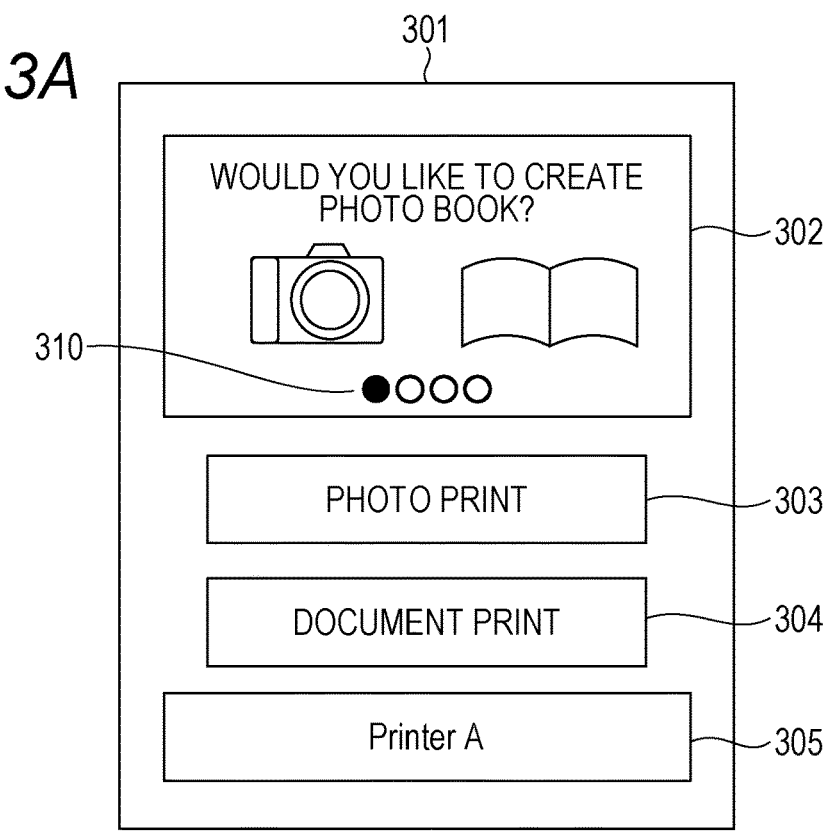
FIGS. 3A and 3B are example diagrams each illustrating a start screen of an application according to an embodiment.
Figure 3B:
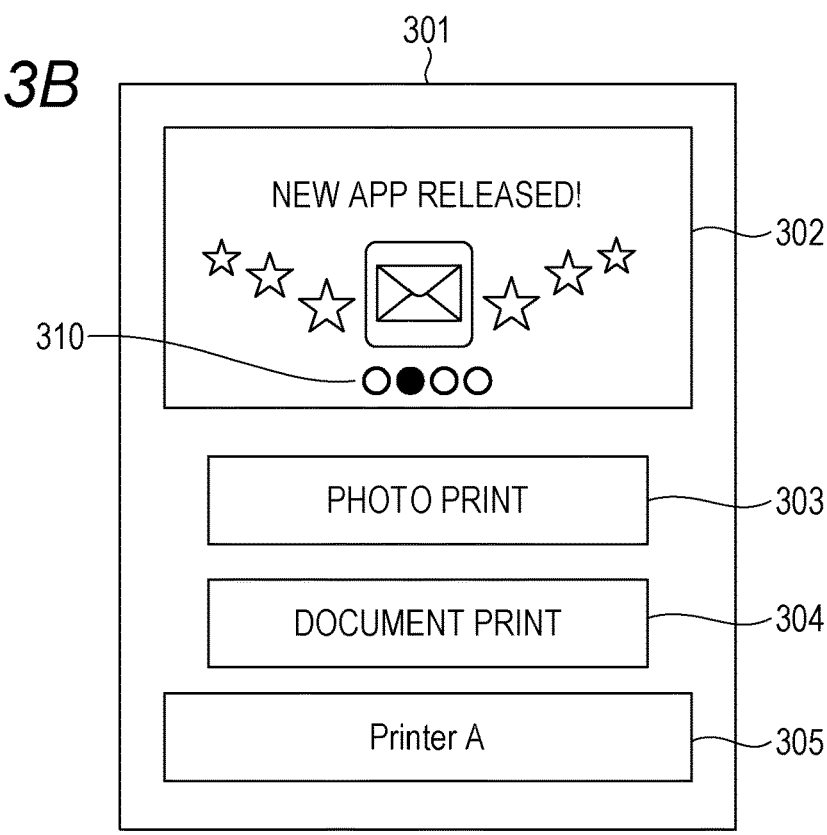

FIGS. 3A and 3B show screens displayed by the print app. The print app displays a start screen 301 on the smartphone 105 as illustrated in FIG. 3A. When a picture print button 303 is tapped, the print app displays a screen (not illustrated) for selecting a picture from the ones stored in the smartphone 105. When a picture is selected by the user, the print app displays a screen (not illustrated) for instructing the printer 106, which is shown on a printer select button 305, to print the selected picture. Note that "Printer A" shown on the printer select button 305 is a name for identifying the printer 106. Specifically, the name is represented by a character string including information about the printer 106 such as a model name or an IP address. Likewise, when a document print button 304 is tapped, the print app displays a screen (not illustrated) for selecting a document from the ones stored in the smartphone 105. Then, the print app displays a screen (not illustrated) for instructing the printer 106 as shown on the printer select button 305 to print the selected document. When the printer select button 305 is tapped, the print app displays a screen (not illustrated) on which an output destination printer can be selected from a list of printers connected to the network 104.

A banner display area 302 is an area displayed by the print app based on the transmitted information transmitted from the server 101, and is, for example, an area predefined in the print app. The banner display area 302 displays a banner web page for advertisement or publicity of the supplier of the print app. Note that displayed areas of the start screen 301 except the banner display area 302 are based not on the information from the server but on the information already included in the print app (for example, text information forming part of a button).

In the present embodiment, a displayed page position indicator 310 is disposed in the displayed banner web page. The example in FIG. 3A shows that the banner web page contains four pages and the first page thereof is displayed. The displayed page is switched to another page by a user action such as flicking or dragging from side to side in FIG. 3A. FIG. 3B illustrates the state in which the second page of the banner web pages is displayed, showing different contents of a banner web page. Alternatively, the print app may automatically switch among displayed pages in the banner display area 302 by skipping to another page at predetermined time intervals.

When the banner display area 302 is tapped by the user, the print app is capable of executing a predetermined process based on the link information in the banner web page being displayed. For example, the print app is capable of launching a web browser app installed on the smartphone 105 to display a web page, launching another application, or guiding to installation of another application. An application to be launched or to be guided to installation when the banner display area 302 is tapped is hereinafter called a guided app. Specifically, the aforementioned process of guiding a guided app to installation is performed by launching an application distribution store app (hereinafter called a store app) prepared by an OS vendor. Alternatively, an application may be guided to installation by accessing a web page for installing applications.

Figure 4:
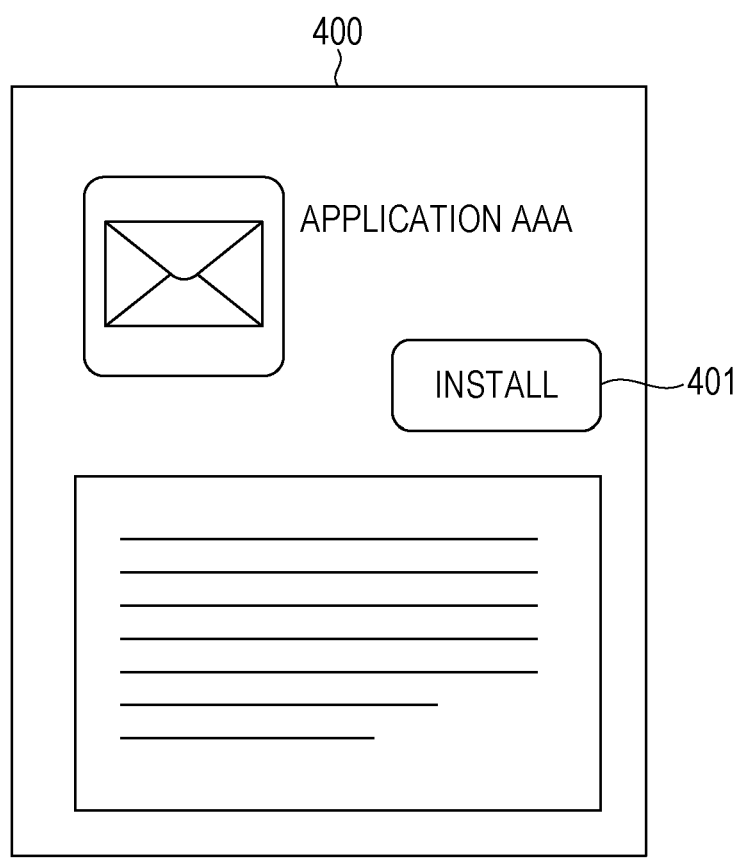
FIG. 4 is an example diagram illustrating a start screen of a store app according to an embodiment.

FIG. 4 is an example of a screen displayed by a store app. FIG. 4 shows an installation screen 400 for an application named "Application AAA". The installation screen 400 shows items including the icon and name of the application as well as feature descriptions about the application. The installation screen 400 further includes an install button 401 intended to give an instruction that "Application AAA" is to be installed on the smartphone 105 being used by the user. When the install button 401 is tapped by the user, the store app starts the process for installing "Application AAA" on the smartphone 105. Specifically, the process by which the smartphone 105 downloads "Application AAA" and installs the application on the OS running on the smartphone 105 is performed. After the installation process is finished, the user can launch "Application AAA" to execute individual functions provided by the application on the smartphone 105.

Descriptions are given below with reference to the process to be executed by the print app when the banner display area 302 on the print app is tapped by the user. FIG. 5 is a flowchart showing the process performed when the banner display area according to the present embodiment is tapped.

In the state in which the start screen 301 illustrated in FIGS. 3A and 3B is displayed, when the start screen 301 is touched (or tapped) by the user, the print app determines which object is placed at the touched (tapped) position. When it is determined that any one of the buttons 303 to 305 in FIGS. 3A and 3B has been touched (tapped), the print app executes the process associated with the touched (tapped) button as described above. When it is determined that the banner display area 302 has been touched (tapped), the process in FIG. 5 is executed as described below.

When the banner display area 302 is tapped, the print app acquires the link information included in the transmitted information and pertaining to the banner web page being displayed when the banner display area is tapped (S501). The link information is included in the transmitted information transmitted from the server 101. FIGS. 6A to 6C show examples of the link information according to the present embodiment.

Next, the print app extracts a protocol from the link information (S502). As shown in FIGS. 6A to 6C, the link information may in some cases include a Uniform Resource Identifier (URI), which is access information for accessing a web page. In such cases, the protocol is represented by the part preceding ":" in a URI. FIG. 6A shows an example in which the protocol is "https". To produce the link information for accessing a web page, the server 101 adds a protocol "http" or "https" to the URL and delivers the information to a terminal device such as the smartphone 105. FIG. 6B shows an example in which the protocol is "appx". To produce the link information for guiding to installation of an application, the server 101 adds a protocol "appx" to the store information and delivers the information to a terminal device such as the smartphone 105.

Next, the print app determines, based on the protocol extracted in S502, whether the URI in the link information is a URL of a web page (S503). In this step, the link information is determined to be a URL of a web page if the protocol included in the transmitted information as an identifier is "http" or "https". When it is determined that the link information represents a URL of a web page in S503, the print app launches a web browser app installed on the smartphone 105 and causes the web page indicated by the URL included in the link information to be displayed (S504). For example, when a notice of the URL of a web page is given to the OS through the use of an API provided by the OS, the OS launches a web browser app and notifies the web browser app of the URL. Consequently, the web browser app accesses and displays the web page in accordance with the URL.

On the other hand, if the protocol included in the transmitted information as an identifier is "appx", the print app determines that the link information is not a URL of a web page in S503. In other words, the print app determines that the protocol is a URI scheme indicating an identifier of a guided app, and executes the process step of S510. In S510, the print app determines whether the guided app (application program) indicated by the protocol, that is, the URI scheme, extracted in S502 is already installed on the smartphone 105. Specifically, the print app makes an inquiry, via an API provided by the OS on which the print app is operated on the smartphone, to the OS regarding whether the application corresponding to the URI scheme extracted in S502 can be launched. In the example illustrated in FIG. 6B, the print app makes a request to the OS for launching the custom URL scheme indicated by "appx://" or the like. When a notice that the launching in accordance with the request is allowed is received from the OS, the print app determines that the guided app is already installed. When a notice that the launching is impossible, or at least not possible, is received, the print app determines that the guided app is not installed yet. If it is determined that the guided app is already installed in S510, the print app causes the OS to launch the guided app (S511). On the other hand, if it is determined that the guided app is not installed yet in S510, the print app executes the process step in S520.

In S520, regarding the URI included in the link information, the print app checks if a parameter following the aforementioned protocol complies with a predetermined format. The parameter following the protocol includes installation information, which is the information relating to installation of a guided app. The installation information of the present embodiment is made up of formats including store information pieces corresponding to their respective different types of OSs. As the print app of the present embodiment, there are provided an application to be operated on OS_A and an application to be operated on OS_B. Both of the applications include a program corresponding to the process shown in FIG. 5. In the example in FIG. 6B, the installation information includes both the store information corresponding to OS_A (designated as store information A) and the store information corresponding to OS_B (designated as store information B). The store information A (the store information B) relates to a store site to be used for downloading and installing applications for OS_A (OS_B) installable on OS_A (OS_B). The store information indicates, for example, a store app that accesses the store site. Furthermore, the store information may include an ID used to specify the target app to be downloaded and installed in the store app.

If it is determined that the link information complies with a predetermined format in S520, the print app executes the process step in S521. On the other hand, if it is determined that the link information is not installation information complying with a predetermined format in S520, the print app exits the process of the flowchart shown in FIG. 5.

In S521, the print app extracts store information regarding the guided app corresponding to an OS on which the print app is operated. In the example in FIG. 6B, "os_a=id12345678" is extracted as the store information if the print app is operated on OS_A while "os_b=com.aaa.bbb.appx" is extracted as the store information if the print app is operated on OS_B.

Next, in S522, the print app launches a store app using the store information for the OS on which the print app is operated. For example, in the case of OS_A in FIG. 6B, when launching the store app, the print app passes a launch parameter "id12345678", which represents the store information regarding the guided app as acquired in S521, to the store app via OS_A. The aforementioned launch parameter passed by the print app to the store app is the app information, namely an app ID, to be used for specifying the guided app. Based on the app ID, the store app becomes able to specify the guided app (e.g., Application AAA) to be guided to installation. When being launched, the store app receives the app ID of the guided app via the OS. Consequently, the store app can be launched while displaying an installation screen for the guided app as illustrated in FIG. 4. Executing the process step in S522 creates the state in which an installation screen for the guided app is displayed on the smartphone 105, and thus the user can easily install the guided app.

As seen above, when the user gives an instruction in response to a banner display that has appeared during execution of the print app, the smartphone 105 can carry out a process suitable for the information associated with the banner by following the process steps shown in FIG. 5. For example, if the banner is associated with link information, the print app can pass the link information to a web browser app so that the smartphone 105 can access the web page corresponding to the link information to display the web page. If the banner is associated with information indicating a guided app, the print app can launch the guided app. Furthermore, if the guided app is not installed on the smartphone 105, the print app can launch a store app to cause the store app to display a screen for installing the guided app.

Furthermore, the print app selects, from the link information, the store information corresponding to the OS on which the print app is operated, and launches a store app based on the selected store information. Therefore, the server 101, which provides a banner and information associated with the banner, does not need to change the store information to be sent in accordance with the OS on which the print app is operated. For example, assuming that the print app for OS_A or the print app for OS_B is provided to a large number of smartphones and that the server 101 determines which OS is used on each smartphone before displaying a banner, a processing load is presumably increased. According to the foregoing embodiment, the server 101 can send the above-described store information covering both OS_A and OS_B to the individual smartphones, and thus a processing load on the server 101 can be reduced.

In the foregoing embodiment, an example of the link information representing information for installing a guided app is made up of parameters including app IDs corresponding to different OSs. However, the link information is not limited thereto. For example, as shown in FIG. 6C, an app ID specific to a regional setting in an OS on which the print app is operated may be prepared. Store apps prepared by OS vendors may sometimes allow applications to be distributed in specific regions on the basis of the regional setting in the smartphone 105 being used by each user. On the other hand, for example, companies delivering guided apps may want to provide services or guided apps that differ in terms of details or provided specifications depending on the region. In such cases, the supplier of a guided app can distribute guided apps having the same URI scheme as if the guided apps are region-specific separate applications. In this case, the guided app will have an app ID that differs depending on the region. Hence, the link information may be configured to include app IDs specific to regions as described above so that, for example, the print app can extract an app ID based on the regional setting in the smartphone 105 in S521. In the example in FIG. 6C, the store information for the smartphone 105 with the regional setting set to Japan is "os_a.jp=id12345678". The store information for the regional setting set to a region other than Japan is "os_a_other-id12341234".

In the case where app IDs include information regarding specific regional settings, the type of the OS may also be taken into consideration. For example, for each of OS_A and OS_B, the link information may include an app ID for Japan and an app ID for regions other than Japan, totaling to four different app IDs. Then, in S521, the print app launches a store app using one of the four different app IDs in accordance with a combination of the type of the OS on which the print app is operated and the regional setting in the smartphone 105. In this case, the server 101 does not need to select an app ID to be provided taking into consideration the type of the OS and the regional setting in each smartphone, and thus a processing load on the server 101 can be reduced.

The configuration as described above allows the print app to launch a web browser app based on the transmitted information from a server to guide the user to a certain web page. In addition, in the state in which a guided app is not installed yet, the print app can launch a store app to prompt the user to install the guided app, thereby providing greater convenience to the user. Furthermore, even when the print app is provided for a plurality of OSs, the server 101 can provide information for launching a store app without the need for taking into consideration the specific OS for which the print app running on each smartphone is provided. Therefore, reduction in a processing load on the server 101 can also be achieved.

Second Embodiment

In the first embodiment above, a process executed by the print app when the banner display area 302 is tapped by the user has been described. In addition to the configuration of the first embodiment, the print app described in the present embodiment is configured to launch a predetermined application and to guide the application to installation when a predetermined button is tapped.

Figure 7:
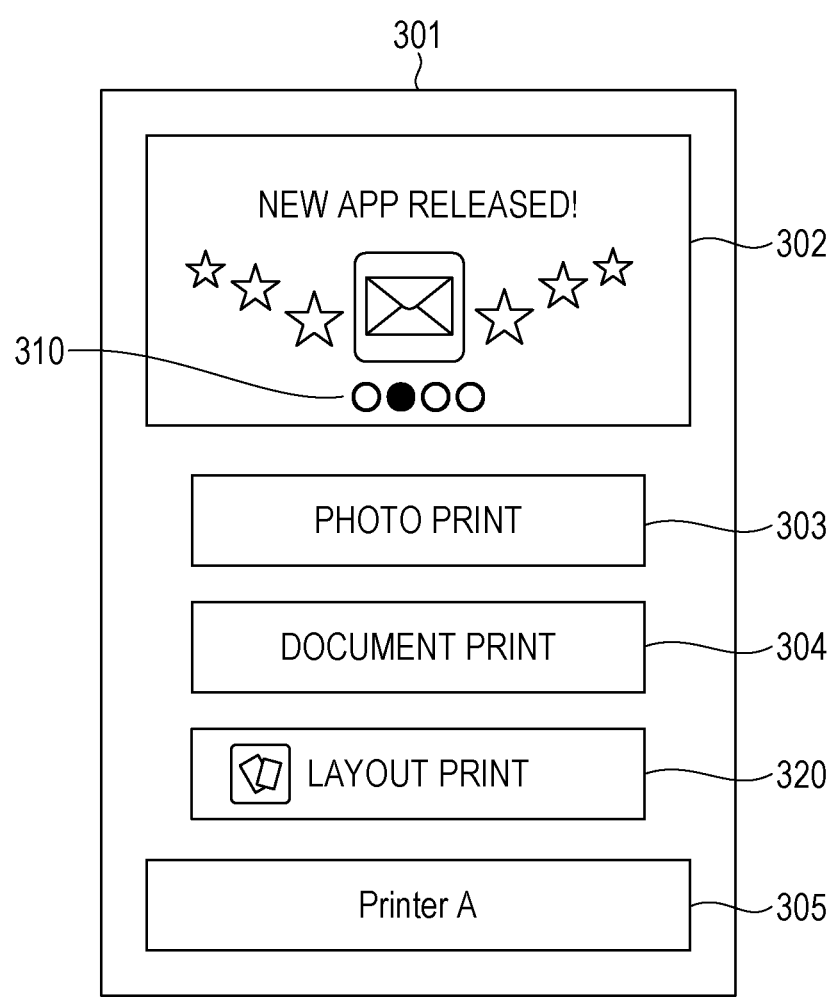
FIG. 7 is an example diagram illustrating a start screen of an application according to an embodiment.

FIG. 7 shows an example of a screen provided by the print app, the screen further including a layout print button 320. The layout print button 320 is to be used by the user to give an instruction for layout print. The layout print refers to a function of laying out and printing pictures by using a prepared template, for example. Specifically, the layout print includes the function of laying out images to create an album and causing the printer 106 to print the album, or the function of placing an order for a print of the album via the Internet 102. The present embodiment assumes that the layout print is provided not by the above-described print app but by another layout print app.

When the layout print button 320 is tapped by the user, the print app launches a predetermined application (such as the aforementioned layout print app; the predetermined application is hereinafter called a cooperative app) based on the URI scheme preassigned to the print app. If the cooperative app is not installed, the print app guides the cooperative app to installation. The button disposed on the print app intended to launch a cooperative app or to guide the cooperative app to installation as described above is hereinafter called a cooperative app button.

Figure 8:
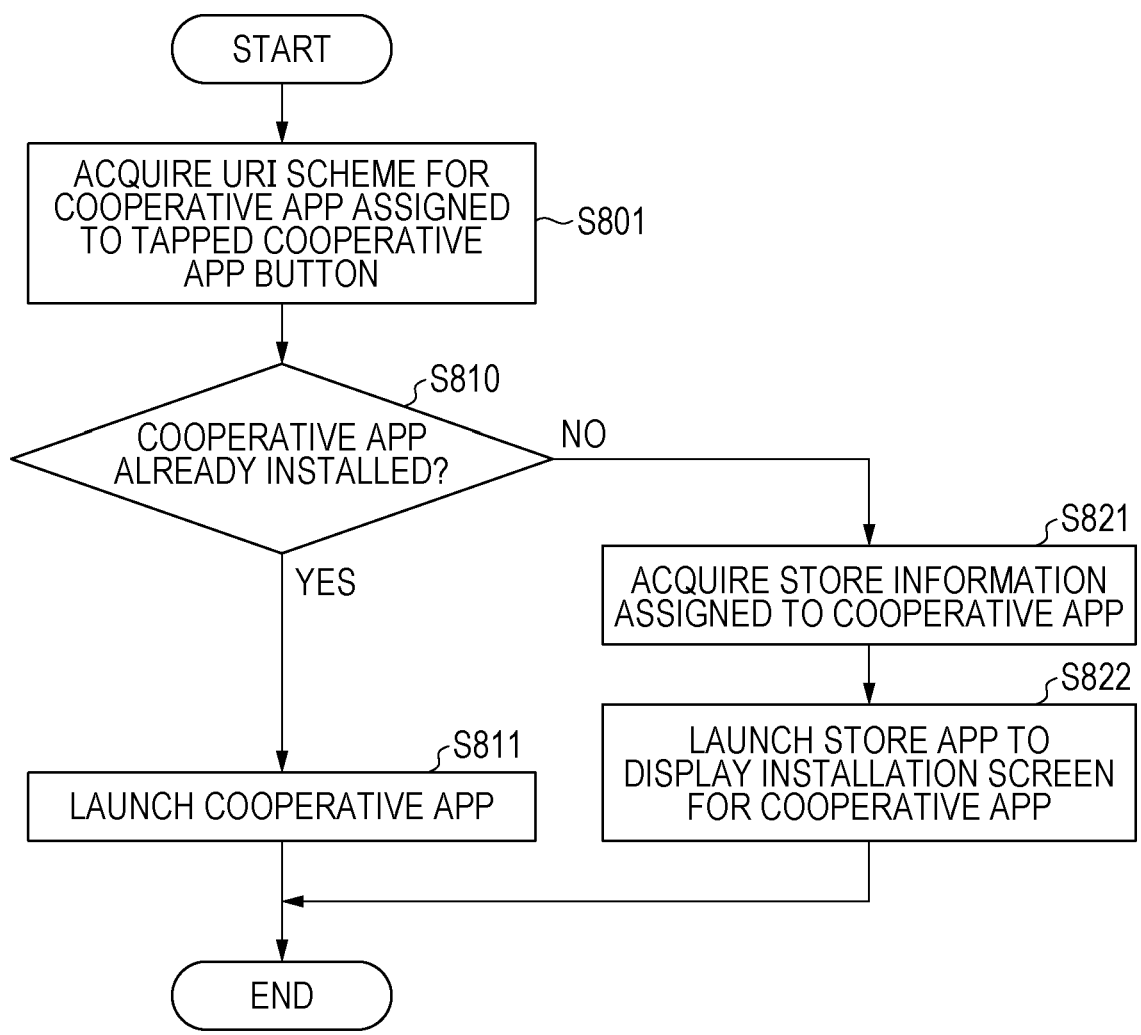
FIG. 8 is a flowchart applied when a cooperative app button is tapped according to an embodiment.

In the state in which the start screen 301 illustrated in FIG. 7 is displayed, when the start screen 301 is touched (or tapped) by the user, the print app determines which object is placed at the touched (tapped) position. When it is determined that any one of the buttons 303 to 305 in FIG. 7 has been touched (tapped), the print app executes the process associated with the touched (tapped) button as described above. When it is determined that the banner display area 302 has been touched (tapped), the process in FIG. 5 is executed as described above. When it is determined that the layout print button 320 has been touched (tapped), the process in FIG. 8 is executed as described below. FIG. 8 shows a flow of process steps executed by the print app when the layout print button 320 on the print app is tapped by the user.

When the layout print button 320 is tapped, the print app acquires the URI scheme for the cooperative app assigned to the layout print button 320 (S801). Then, the print app determines whether the cooperative app indicated by the aforementioned URI scheme is already installed on the smartphone 105 (S810). As in the determination step S510 described above, the determination step in S810 is performed by making an inquiry to the OS via an API provided by the OS. If it is determined that the cooperative app is already installed in S810, the print app launches the cooperative app through the OS (S811). On the other hand, if it is determined that the cooperative app is not installed yet in S810, the print app executes the process step in S821.

In S821, the print app acquires the installation information preassigned to the cooperative app. Specifically, the installation information acquired in this step is an app ID equivalent to the store information regarding the cooperative app. Next, the print app launches a store app using the app ID acquired in S821 as a launch parameter (S822). The process step in S822 is similar to that in S522 described above, and thus its detail description is omitted.

As described above, executing the process step in S822 creates the state in which an installation screen for the cooperative app is displayed on the smartphone 105, and thus the user can easily install the cooperative app. In addition, disposing the cooperative app button on the print app produces an effect of making it easier for the user to select launching the cooperative app or being guided to installation of the cooperative app.

On the other hand, concerning a guided app to be launched or to be guided to installation when the banner display area 302 is tapped, the guided app is launched or guided to installation based on transmitted information transmitted from the server 101. Therefore, a new guided app can be presented to the user while the user does not need to update the print app, thereby producing an effect of providing greater convenience to the user. Thus, disposing the cooperative app button and the banner display area on the print app produces an effect of providing possibilities to the supplier of the print app to make advertisement, announcement, or the like of the application in a variety of forms.

Note that the URI scheme acquired by the print app in S801 in FIG. 8 includes, as the store information including an app ID (app information) to be used for specifying the guided app, the information corresponding only to the OS on which the print app is operated. For example, the URI scheme includes only an app ID (store information) for the OS on which the print app is operated, selected from an app ID for OS_A and an app ID (store information) for OS_B as shown in FIG. 6B. In other words, unlike the app information included in transmitted information, in the print app, only the app information corresponding to the OS on which the print app is operated is associated with the cooperative app button in the print app. This is because the URI scheme is not included in the transmitted information transmitted from the server as illustrated in FIGS. 6A to 6C but is prepared in advance in the print app. In other words, the developer of the print app can add, for example, the store information for a specific type of OS to the print app for the specific type of OS, and accordingly, the print app includes the store information corresponding to a specific OS only. However, this is not restrictive, and alternatively the URI scheme may include store information pieces for different OSs, and the process step shown in S521 in FIG. 5 may be executed in S821 so that the store information corresponding to the OS on which the print app is operated may be acquired. In this case, the developer of the print app may not necessarily include different store information pieces corresponding to a plurality of OSs.

Other Embodiments

Processes executed on an application according to the foregoing embodiments have been described by taking a print app as an example, but the application is not limited thereto. For example, the application may be a scanning app used for causing a scanner to scan original documents, or may be a camera app used for importing pictures from a camera or the like, operating a camera, and so on. The application may also be any of a variety of applications providing various services, including a mail app, an SNS app, a shopping app, and a game app.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068046, filed Mar. 29, 2019, which is hereby incorporated by reference herein in its entirety.

What is claimed is:

1. An information processing method implemented by executing a first application program by an information processing apparatus configured to perform display based on transmitted information transmitted from a server and including at least one processor, the information processing method comprising:
receiving transmitted information including a plurality of pieces of app information including first app information regarding a second application program corresponding to a first operating system and different from the first application program and second app information regarding a third application program corresponding to a second operating system and different from the first application program and the second application program by the at least one processor from the servers;
extracting app information corresponding to an operating system on which the first application program is operated from among the plurality of pieces of app information by the at least one processor; and
executing a process based on the extracted app information by the at least one processor when a predetermined object displayed by the first application program is indicated by a user.

2. The information processing method according to claim 1, further comprising determining whether the transmitted information includes access information for accessing a web page,
wherein executing includes executing the process when it is determined that the transmitted information does not includes the access information, and
wherein executing includes executing a process for launching a predetermined web browser and causing the web page to be displayed by the predetermined web browser when it is determined that the transmitted information includes the access information for accessing a web page.

3. The information processing method according to claim 2,
wherein the transmitted information includes an identifier for identifying whether information included in the transmitted information is the access information or the app information regarding an application program, and
wherein determining includes determining, in accordance with the identifier, whether the transmitted information includes access information for accessing the web page.

4. The information processing method according to claim 1, further comprising determining whether an application program corresponding to the extracted app information is installed on the information processing apparatus,
wherein executing includes executing the process when it is determined that the application program corresponding to the extracted app information is not installed on the information processing apparatus, and
wherein executing includes executing a process for causing the application program corresponding to the extracted app information to be launched when it is determined that the application program corresponding to the extracted app information is installed on the information processing apparatus.

5. The information processing method according to claim 4,
wherein determining whether the application program corresponding to the extracted app information is installed on the information processing apparatus is based on information acquired from an operating system on which the first application program is operated.

6. The information processing method according to claim 1, wherein executing includes launching, based on the extracted app information and as the process, a store app for causing the application program corresponding to the extracted app information to be installed on the information processing apparatus.

7. The information processing method according to claim 6, wherein launching further includes causing the store app to display a screen for installing the application program corresponding to the extracted app information.

8. The information processing method according to claim 1,
wherein the plurality of pieces of app information includes the first app information corresponding to a first region, the first app information corresponding to a second region different from the first region, the second app information corresponding to the first region, and the second app information corresponding to the second region, and
wherein the extracted app information further corresponds to a regional setting corresponding to the information processing apparatus.

9. The information processing method according to claim 1, wherein the processing application program has a print function of causing a printer to print data.

10. An information processing apparatus configured to execute a first application program and to perform display based on transmitted information transmitted from a server and including at least one processor, the information processing apparatus comprising:
a receiving unit configured to receive transmitted information including a plurality of pieces of app information including first app information regarding a second application program corresponding to a first operating system and different from the first application program and second app information regarding a third application program corresponding to a second operating system and different from the first application program and the second application program by the at least one processor from the server;
an extraction unit configured to extract app information corresponding to an operating system on which the first application program is operated from among the plurality of pieces of app information by the at least one processor; and
an execution unit configured to execute a process based on the extracted app information by the at least one processor when a predetermined object displayed by the first application program is indicated by a user.

11. The information processing apparatus according to claim 10, further comprising a determination unit configured to determine whether the transmitted information includes access information for accessing a web page,
wherein the execution unit executes the process when it is determined that the transmitted information does not includes the access information, and
wherein the execution unit executes a process for launching a predetermined web browser and causes the web page to be displayed by the predetermined web browser when it is determined that the transmitted information includes the access information for accessing a web page.

12. The information processing apparatus according to claim 11,
wherein the transmitted information includes an identifier for identifying whether information included in the transmitted information is the access information or the app information regarding an application program, and
wherein the determination unit determines, in accordance with the identifier, whether the transmitted information includes access information for accessing the web page.

13. The information processing apparatus according to claim 10, further comprising a determination unit configured to determine whether an application program corresponding to the extracted app information is installed on the information processing apparatus,
wherein the execution unit executes the process when it is determined that the application program corresponding to the extracted app information is not installed on the information processing apparatus, and
wherein the execution unit executes a process for causing the application program corresponding to the extracted app information to be launched when it is determined that the application program corresponding to the extracted app information is installed on the information processing apparatus.

14. The information processing apparatus according to claim 13,
wherein the determination unit determines, based on information acquired from an operating system on which the first application program is operated, whether the application program corresponding to the extracted app information is installed on the information processing apparatus.

15. The information processing apparatus according to claim 10, wherein the execution unit launches, based on the extracted app information and as the process, a store app for causing the application program corresponding to the extracted app information to be installed on the information processing apparatus.

16. The information processing apparatus according to claim 15, wherein the execution unit causes the store app to display a screen for installing the application program corresponding to the extracted app information.

17. The information processing apparatus according to claim 10,
wherein the plurality of pieces of app information includes the first app information corresponding to a first region, the first app information corresponding to a second region different from the first region, the second app information corresponding to the first region, and the second app information corresponding to the second region, and
wherein the extracted app information further corresponds to a regional setting corresponding to the information processing apparatus.

18. The information processing apparatus according to claim 10, wherein the processing application program has a print function of causing a printer to print data.

19. An information processing system comprising:
a server; and
an information processing apparatus configured to execute a first application program and to perform display based on transmitted information transmitted from the server and including at least one processor, wherein the server includes:
a receiving unit configured to receive transmitted information, wherein transmitted information includes a plurality of pieces of app information including first app information regarding a second application program corresponding to a first operating system and different from the first application program and second app information regarding a third application program corresponding to a second operating system and different from the first application program and the second application program by the at least one processor from the server;
an extraction unit configured to extract app information corresponding to an operating system on which the first application program is operated from among the plurality of pieces of app information by the at least one processor; and
an execution unit configured to execute, a process based on the extracted app information by the at least one processor when a predetermined object displayed is indicated by a user.

* * * * *